UNITED STATES PATENT OFFICE.

CHARLES A. DOREMUS, OF NEW YORK, N. Y.

PROCESS OF OBTAINING ALUMINIUM FLUORID.

1,110,675.

Specification of Letters Patent. Patented Sept. 15, 1914.

No Drawing.

Application filed April 2, 1914. Serial No. 829,014.

*To all whom it may concern:*

Be it known that I, CHARLES A. DOREMUS, a citizen of the United States, residing in the county, city, and State of New York, have invented a new and useful Improvement in Processes of Obtaining Aluminium Fluorid, of which the following is a specification.

My invention relates to the process of obtaining aluminium fluorid from its solutions, and its object is to produce pure aluminium fluorid in solid form.

During the evaporation of a solution of aluminium fluorid, crystals of fluorid separate, containing water of crystallization. Their composition may be represented by the formula $Al_2F_6, 7H_2O$. They are practically insoluble in water. If the fluorid solution be cooled to the freezing point of water, the separating crystals will be of another form and composition. In water these will be quite soluble, and their composition may be represented by the formula $Al_2F_6, 18H_2O$. Upon applying heat these crystals melt, and if exposed to the air or to heat, will lose part of the water of crystallization. The resulting product is insoluble in water. In working my improved process, I depart completely from all existing methods. In a closed vessel I heat the solution of aluminium fluorid, thus preventing any evaporation, and thereby obtain solid aluminium fluorid, which, under any of the conditions hereinafter stated, is practically insoluble, even in boiling water.

I have found that the amount of water of crystallization in the product varies with the temperature at which such product is formed, and also, since the vessel is closed, that the pressure varies with the temperature. Thus, if the aluminium fluorid solution in such vessel be heated to 115° C., the steam gage will show about ten pounds pressure, and the composition of the resulting crystals may be represented by the formula $Al_2F_6, 7H_2O$. But if the solution be heated to a temperature of 121° C., when the gage will show a pressure of about fifteen pounds, the product will contain less water of crystallization than in the preceding instance, the crystals will be of a different shape, and their composition may be represented by the formula $Al_2F_6, 5H_2O$. The latter crystals are practically insoluble, even in boiling water. And if temperatures still higher than those last mentioned are used, with correspondingly higher pressures, proportionately less water of crystallization will be found in the product than appears in the above specified instances.

Although the solution of aluminium fluorid be impure, a purified product, as in other crystallizations, will result, the foreign substances remaining in the mother liquor. Thus if ferrous fluorid be present, it remains in solution. There is a possibility, if the elements therefor be present, of the formation of double salts, but the usual result is as stated.

In carrying out my improved process, I proceed as follows: Into a suitable pressure kettle, or autoclave, which is providedd with a stirrer, I introduce the aluminium fluorid solution, having a specific gravity of 1150 or higher. The solution is then suitably heated, as by the application thereto of steam, which is let into a jacket at the bottom of the autoclave. When the solution has become boiling hot, the valves of the autoclave are closed, and the pressure raised to ten pounds on the steam gage. This pressure is to be maintained for several hours, at the end of which there will have been produced in the autoclave, a magma of crystals, which may then be discharged and the crystals separated from the mother-liquor, either by settling, filtration, centrifugation, or by any other of the well known separating devices. The crystals may then be washed with water and collected. The specific gravity of the mother-liquor will be quite low and vary with circumstances. A fair example is 1050 or lower. If the original solution be high in impurities, the specific gravity of the mother-liquor will be high.

As stated above, the aluminium fluorid crystals will be free from iron salts, especially if the iron in the solution was present as ferrous fluorid. In such case the resulting crystals will be of the formula $Al_2F_6, 7H_2O$. But if the solution is heated till the gage shows a pressure of about fifteen pounds, the composition will be $Al_2F_6, 5H_2O$.

The separation from iron is the same as in the case of the other crystals. In each instance the separation of impurities takes place in the manner above described, independently of hydration of the crystals.

What I claim as new, and desire to secure by Letters Patent, is:

1. The process of obtaining aluminium fluorid from its solutions, which consists in the application of heat to said solution contained in a closed vessel, substantially as described.

2. The process of obtaining aluminium fluorid having variable amounts of water of crystallization, or none thereof, by heating, in a closed vessel, a solution of such aluminium fluorid, the proportion of water of crystallization diminishing according as the temperature applied is raised, substantially as described.

3. The process of obtaining hydrous aluminium fluorid in crystalline form, which consists in heating, in a closed vessel, a solution of aluminium fluorid, and stirring the same while heating continues, substantially as described.

CHARLES A. DOREMUS.

Witnesses:
  WM. S. BEAMAN,
  CHARLES B. MEYER.